United States Patent
Choi et al.

(10) Patent No.: US 9,710,661 B2
(45) Date of Patent: Jul. 18, 2017

(54) PRESENCE-BASED CONTENT SHARING

(71) Applicant: Samsung Electronics Co., Ltd., Gyeonggi-do (KR)

(72) Inventors: Woojun Choi, Gyeonggi-do (KR); Juseung Lee, Gyeonggi-do (KR); Soonhyun Cha, Seoul (KR); Sunmin Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 297 days.

(21) Appl. No.: 14/107,495

(22) Filed: Dec. 16, 2013

(65) Prior Publication Data

US 2015/0169883 A1 Jun. 18, 2015

(51) Int. Cl.
| | |
|---|---|
| *H04L 29/06* | (2006.01) |
| *G06F 21/60* | (2013.01) |
| *H04L 12/58* | (2006.01) |
| *G06F 21/10* | (2013.01) |

(52) U.S. Cl.
CPC ............ *G06F 21/606* (2013.01); *G06F 21/10* (2013.01); *H04L 51/043* (2013.01); *H04L 51/046* (2013.01)

(58) Field of Classification Search
CPC .............................. G06F 21/606; H04L 51/046
See application file for complete search history.

(56) References Cited

U.S. PATENT DOCUMENTS

| | | | |
|---|---|---|---|
| 8,090,779 B2* | 1/2012 | Ludwig et al. ............... 709/206 |
| 9,104,302 B2* | 8/2015 | Chai ................... G06F 3/04817 |
| 2007/0130158 A1* | 6/2007 | LaBiche ........... H04L 29/06027 |
| 2008/0065997 A1 | 3/2008 | Szeto et al. |
| 2008/0313256 A1* | 12/2008 | Kanazawa et al. ........... 709/201 |
| 2009/0022095 A1* | 1/2009 | Spaur et al. ................... 370/329 |
| 2010/0175100 A1 | 7/2010 | Ogasawara |
| 2011/0165841 A1 | 7/2011 | Baek et al. |
| 2012/0109836 A1* | 5/2012 | Chen et al. ................... 705/319 |
| 2012/0136945 A1 | 5/2012 | Lee et al. |
| 2012/0331568 A1* | 12/2012 | Weinstein et al. .............. 726/29 |
| 2013/0080915 A1 | 3/2013 | Lewis et al. |
| 2013/0097516 A1 | 4/2013 | Hong et al. |

(Continued)

FOREIGN PATENT DOCUMENTS

| | | |
|---|---|---|
| JP | 2010-161510 A | 7/2010 |
| KR | 10-2004-0012311 A | 2/2004 |

(Continued)

*Primary Examiner* — Jeffrey Pwu
*Assistant Examiner* — William Corum, Jr.
(74) *Attorney, Agent, or Firm* — Cha & Reiter, LLC.

(57) ABSTRACT

A device and a method operative therein for sharing content with at least one second device. A messaging application is executed in which a contact list is displayed. A selection is detected, from among contacts displayed on the contact list, of only a portion of the contacts to receive shared content. Presence information is published to all of the contacts on the contact list. An indication of contents available for sharing is included in the presence information published to only the selected portion of the contacts. The device may be a control device in a local area network, and the shared content may be retrievable from a peripheral device controlled by the control device, where information on the peripheral device is included in the presence information.

18 Claims, 9 Drawing Sheets

(56) References Cited

U.S. PATENT DOCUMENTS

| | | | |
|---|---|---|---|
| 2013/0332553 A1 | 12/2013 | Hung et al. | |
| 2014/0006496 A1* | 1/2014 | Dearman et al. | 709/204 |
| 2014/0033265 A1* | 1/2014 | Leeds et al. | 726/1 |
| 2014/0201648 A1* | 7/2014 | Branson et al. | 715/748 |
| 2014/0250193 A1* | 9/2014 | Goncalves et al. | 709/206 |
| 2014/0282102 A1* | 9/2014 | Avrahami | 715/753 |
| 2014/0310348 A1* | 10/2014 | Keskitalo et al. | 709/204 |
| 2014/0365919 A1* | 12/2014 | Shaw et al. | 715/753 |
| 2015/0326689 A1* | 11/2015 | Leppanen | G06Q 10/101 370/328 |

FOREIGN PATENT DOCUMENTS

| | | |
|---|---|---|
| KR | 10-2011-0080348 A | 7/2011 |
| KR | 10-1071552 B1 | 10/2011 |
| KR | 10-2012-0058782 A | 6/2012 |
| KR | 10-2013-0041607 A | 4/2013 |

* cited by examiner

PRESENCE-BASED CONTENT SHARING

BACKGROUND

1. Technical Field

The present disclosure relates generally to techniques for content sharing among communication devices.

2. Description of the Related Art

A content sharing service platform enables users of devices at remote locations to share multi-media content such as photographs, videos, music and documents stored within their devices. Content sharing has become particularly popular among mobile device users, where content is shareable over a wide area network. Recently developed methods allow a user to group several personal content storage devices so that each device becomes available to provide content associated with that user to third parties.

Internet and mobile chatting, messenger, Social Network Services (SNSs) and VoIP services allow a user to publish his "presence information" to other users. A user who publishes presence information is often referred to as a "presentity". Presence information is a status indicator that conveys the ability and willingness of a potential communication partner to communicate. Traditional presence information just shows a communication status such as "free for chat", "busy" or "away". Recently, presence information has expanded to include a current communication bearer (i.e., wireless protocol) of the user device such as Wi-Fi, 3G or 4G, which is displayed on a contacts page or phonebook adjacent other contact information of an instant messaging application. For instance, certain services charge for data usage via 3G and 4G but not for Wi-Fi, and video conferencing is only available through Wi-Fi for some providers. Thus, knowing communication capabilities beforehand is an added convenience to users.

One method of sharing contents between mobile devices involves the provision of IP addresses. That is, each mobile device obtains the IP address of one or more other mobile devices with which communication is desired. However, users are inconvenienced by the process of confirming the IP address of the other mobile device prior to sharing contents for every sharing session.

Another method of sharing contents utilizes a content sharing application. Here, each participating mobile device needs to download and set up the same content sharing application. Each device also needs to know the user ID of the other party device prior to sharing content. Hence, these types of content sharing applications have proved cumbersome to users.

SUMMARY

In exemplary embodiments, a messaging application is executed in a device, in which a contact list is displayed. A selection is detected, from among contacts displayed on the contact list, of only a portion of the contacts to receive shared content. Presence information is published to all of the contacts on the contact list. An indication of contents available for sharing is included in the presence information published to only the selected portion of the contacts.

The device may be a control device in a local area network, and the shared content may be retrievable from a peripheral device controlled by the control device, where information on the peripheral device is included in the presence information.

The indication of contents available for sharing may comprise at least one of a device icon representing a device from which the contents are available; a number of contents available; a device model of the device from which the contents are available; and an Internet Protocol (IP) address of the device from which the contents are available.

The presence information published to the selected portion of the contacts may further include an indication of a communication protocol restriction in which the content is downloadable to the second device only if at least the control device is connected to a wide area network via a specified communication protocol.

The control device may also receive shared content from a third party device. In an implantation, the messaging application which displays a contact list screen containing a plurality of contact fields, where each contact field associated with a specific contact and displaying presence information of that specific contact. The presence information of a given contact also displays a selectable item representing shareable content available from the third party device which is controlled by the given contact. A detection for a selection of the selectable item is detected, and in response, a request for the available shareable content is transmitted to the third party device.

In another embodiment of a method, which is performed in a first device for sharing content, a user selection for content to be shared is detected. Presence information is published to at least one target device, where the presence information includes an indication of one or more peripheral devices of the first device storing the selected content. The selected content is downloadable to the target device from the peripheral device.

BRIEF DESCRIPTION OF THE DRAWINGS

The above and other aspects, features and advantages of the present technology will become more apparent from the following detailed description, taken in conjunction with the accompanying drawings in which like reference numerals indicate like elements or features, wherein.

DETAILED DESCRIPTION

Figure 1:
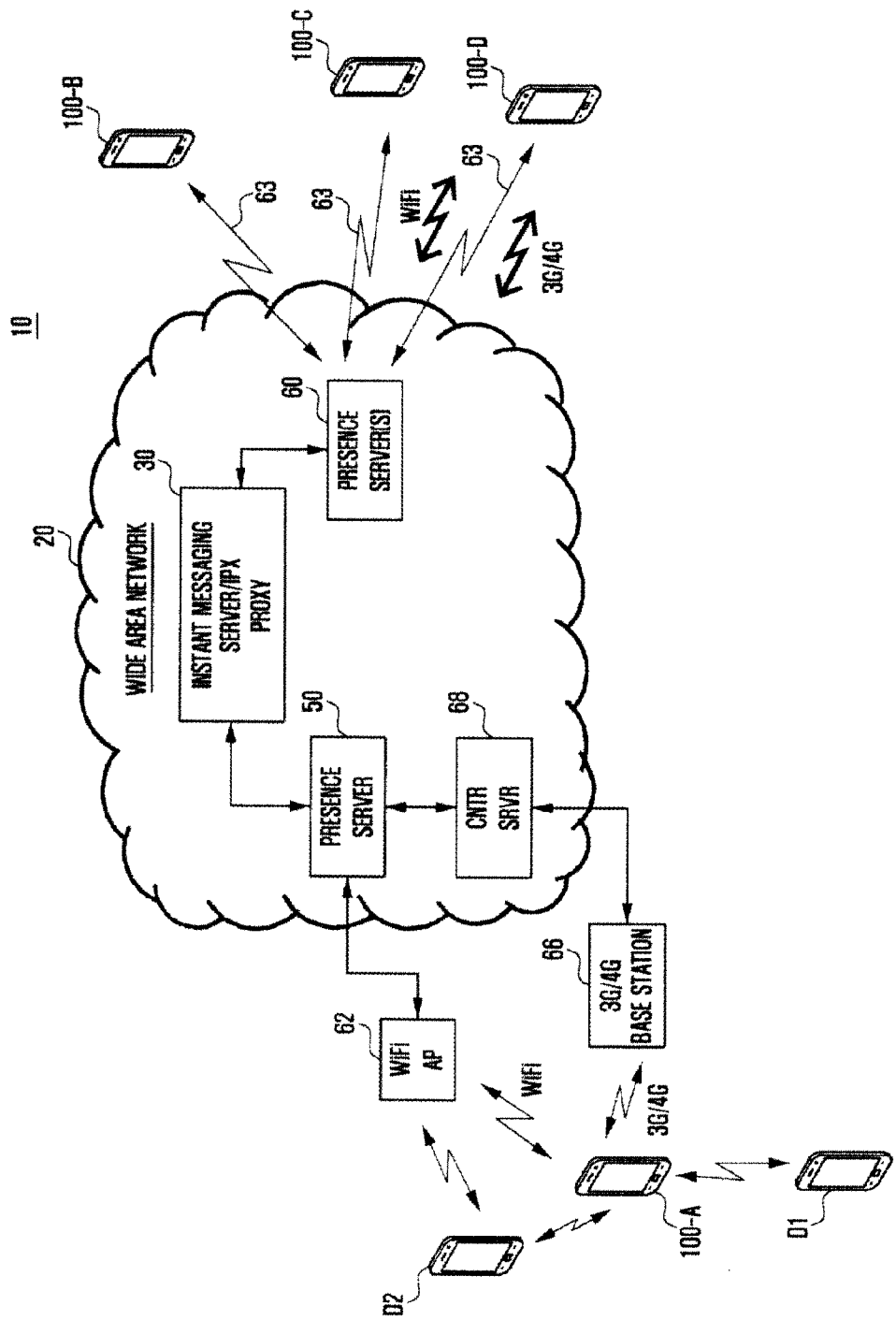
FIG. 1 is a functional block diagram of an exemplary data communication system which allows for messaging and content sharing in accordance with the present technology.

The following description, with reference to the accompanying drawings, is provided to assist in a comprehensive understanding of certain exemplary embodiments of the technology provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. For the purposes of simplicity and clarity, descriptions of well-known functions and constructions may be omitted when their inclusion may obscure appreciation of the subject matter of the claimed invention by a person or ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments are provided for illustration purpose only and not for the purpose of limiting the invention as defined by the appended claims and their equivalents.

Herein, the term "content" refers to data representing text, still images, moving images, audio, and combinations thereof. An item of content can be a particular photograph, a word processing file, video clip, audio clip, etc. A number N of items of content is referred to as "N contents".

Herein, the term "source device" is used to refer to an end user device from which shared content is transmitted, or as a control device that controls transmission of shared content from an associated device in a local network. A source device that controls content sharing of an associated local device can also be called a control node. The associated local device controlled by the source device is referred to as a "peripheral device" or "peripheral node". Terms such as "target device", "third party device" and "receiving device" are used interchangeably to refer to an end user device that receives the shared content transmitted by the source device or its peripheral device.

Herein, a source device or target device can be any display device with data storage, processing, and communication capability. Examples include handheld, portable electronic devices, e.g., smartphones, tablet computers and smart cameras, as well as larger devices such as laptops, desktop PCs and smart TVs. Note that the embodiments described herein are particularly applicable to portable and wireless-capable devices; however, the disclosed technology is applicable to fixed and wired devices as well.

The terms 3G and 4G refer to the well-known protocols of third and fourth generation mobile communication technologies, respectively. 4G is also known as Long Term Evolution (LTE). Wi-Fi is the well-known Wireless Fidelity short range communication technology, also known as IEEE 802.11 technology.

FIG. 1 is a functional block diagram of an exemplary data communication system 10 which allows for messaging and content sharing in accordance with an embodiment of the present technology. System 10 allows end user devices 100, e.g., 100-A, 100-B, 100-C and 100-D, to share content amongst one another through an IP based wide area network (WAN) 20, e.g., the Internet or a private network. WAN 20 includes an instant messaging (IM) server/IPx proxy entity 30 (hereafter, "IM server 30") operated by a service provider to provide at least instant messaging services for the various mobile devices 100. Presence servers 50, 60 are communicatively coupled between IM server 30 and the devices 100.

Each device 100 can be connected in a local area network (LAN) to one or more associated, peripheral devices (equivalently, "peripheral nodes") that store personal content which is shareable with other (target) devices 100. Nodes refer to devices that provide IP-based wireless communication functions.

For instance, device 100-A is communicatively coupled to peripheral devices D1 and D2 in a LAN such as a home network or enterprise network. Device 100-A acts as a control device in the LAN, where it controls the transfer of personal content stored within peripheral devices D1 and D2 to target devices 100-B, 100-C and 100-D. Device 100-A can also be referred to as a control node. Device 100-A is assumed to be connectable to the WAN 20 through either a Wi-Fi link or a 3G/4G link, and may be assigned a phone number by a service provider for 3G/4G telephony. Alternatively, device 100-A may only be 3G/4G enabled for data communication. In either case, 3G/4G Internet data usage by device 100-A may be monitored, and charges may be incurred for 3G/4G data usage. 3G/4G data and telephony communication is routed via a base station 66 and a control server 68. Conversely, when device 100-A is connected to WAN 20 via Wi-Fi through a Wi-Fi Access Point (AP) 62, the cost for data usage is either free or significantly less than that for 3G/4G. Similarly, target devices 100-B, -C, and -D may be capable of connection to WAN 20 via links 63 using either Wi-Fi or 3G/4G, using similar base stations and APs (not shown). On the other hand, some of peripheral devices D1, D2, etc. may only be configured for Wi-Fi connection to WAN 20, and not for a 3G/4G connection; other peripheral devices may be 3G/4G capable. It should be noted that the use of other short range and long range wireless communication protocols are also possible; the present technology is not limited to any particular wireless protocols.

As will be described in further detail below, a user interface of a control device 100-A allows a user to select peripheral devices and content stored therein for sharing with selected third party target devices. When a user of a controlling device 100-A desires to share content as a content provider, the user commands device 100-A to publish an updated presence to the presence server 50. This presence information, in accordance with the present technology, differs from traditional presence information by including an indication of available content for sharing. The available content indication is selectively provided to desired target users, whereby the actual content can be automatically downloaded via selection by the target user. The presence information may further include an indication of at least one peripheral device storing the content desired to be shared. In this manner, the third party can recognize the exact source of the offered content, and directly access the peripheral device in some implementations.

The presence information may also include a selection of a communication bearer to handle the data sharing, e.g., from among Wi-Fi, 3G or 4G. The presence information may further include an indication of the number of content items that are available for sharing from corresponding associated devices D1, D2, etc. As mentioned, if Wi-Fi is available, it is a preferable choice since service providers may charge subscribers for data usage in a 3G/4G medium whereas Wi-Fi usage is often unlimited or less costly. In any event, end user device 100-A may publish its presence information via the Wi-Fi link or 3G/4G link, and target devices 100-B, 100-C, 100-D may be notified of the presence information via their currently connected links. However, the protocol by which data is finally downloaded may differ from that used for publishing and notifying the presence information.

IM server 30 provides at least IM (chatting) services to users, and may also serve as a conduit by which the contents are shared between the user devices. To this end, IM server 30 sets up an IP connection to each first party user device, and forwards presence information of third party users that are on each first party user's contacts list. IM server 30 sets up logical connections between user devices to forward chatting messages to recipients selected by the message generating users. IM server 30 parses the presence information provided by a control device such as 100-A, and selectively provides different presence information for the control device 100-A user to different respective target devices 100. In this manner, only intended recipients on a messaging contact list of content-available indications receive those indications, while other contacts on the list only receive basic presence information (e.g., online or "free", offline, away) of the device 100-A user.

Figure 2A:
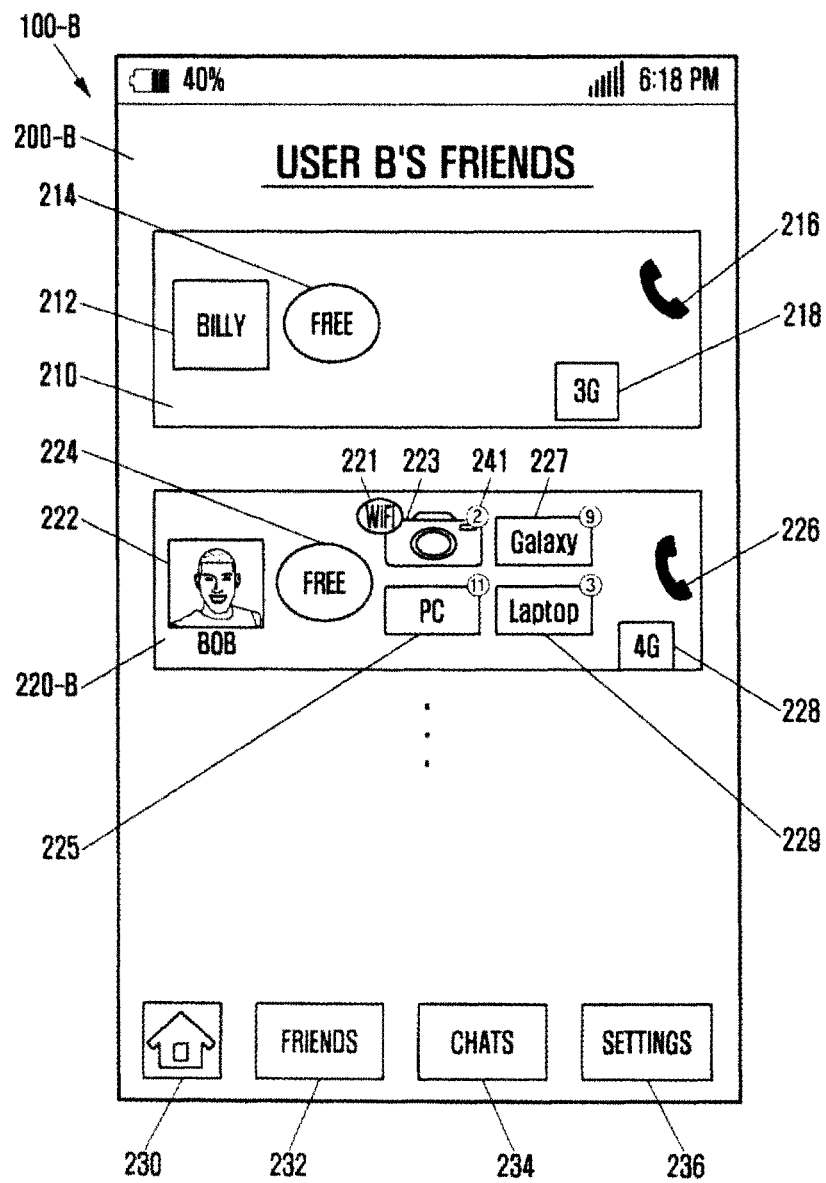
FIGS. 2A, 2B and 2C are example instant messenger screenshots of respective user devices in the communication and messaging system of FIG. 1, for illustrating an exemplary user interface in accordance with the present technology.
Figure 2B:
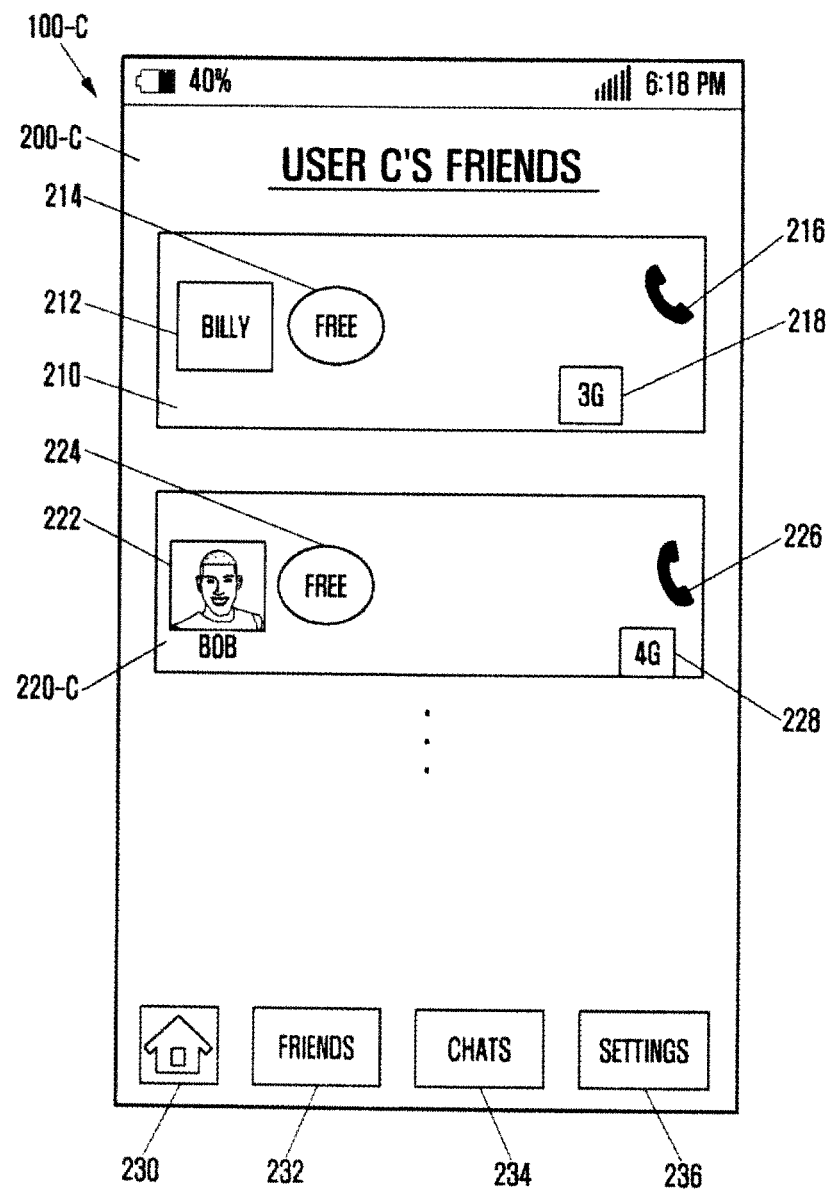
Figure 2C:
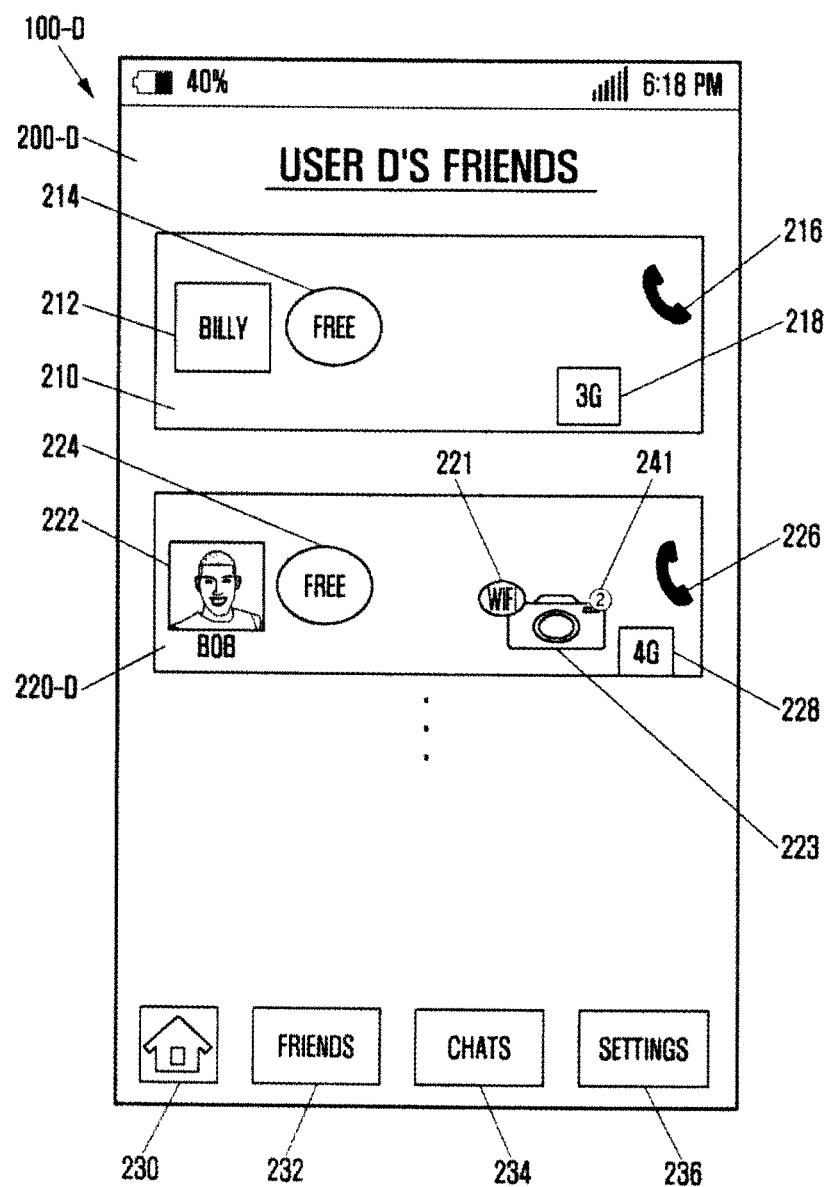

FIGS. 2A, 2B and 2C are example instant messenger screenshots of target devices 100-B, 100-C and 100-D, respectively, for illustrating an exemplary user interface in accordance with the present technology. In these examples, it is assumed that a user/owner "Bob" of source device 100-A has selected users at devices 100-B, 100-C and 100-D (hereafter, users B, C and D, respectively) for inclusion in his contacts ("friends") list for messaging in a messaging service such as an IM service. Likewise, users B, C and D have each included Bob in their friends list for the same IM service. It is further assumed that the screenshots are screens existing at about the same time. In accordance with the presently disclosed technology, users are permitted to selectively publish their presence information so that different presence information can be presented to different respective contacts at any given time. Such selective presence information includes not only online/offline type presence information but also the availability of personal content for sharing. In the current example, it is assumed that Bob has chosen to share some of his content with users B and D, but not with user C. However, Bob still desires to maintain user C as a current chatting party. Bob has also chosen to make more content items available to user B than to user D.

As shown in FIG. 2A, in the above scenario, device 100-B has executed a messenger/content sharing application in which an instant messenger screen 200-B is displayed. Screen 200-B, which may be a touchscreen, shows a friends list which is accessed via selecting a friend icon 232, or which initially appears when the messenger application is newly selected for execution. (Other icons such as chats 234 and settings 236 execute corresponding functions in the IM application, and an exit icon 230 may also be displayed.) Any friend on the list who has a presence status of "free" can be contacted for instant messaging via a predetermined operation, such as a predetermined touch gesture relevant to that friend's display field. Screen 200-B initially includes contact fields 210, 220-B, etc., each displaying contact and presence information of a particular contact. Field 210 is designated for the contact "Billy", contains an icon 212 designating Billy (and/or a photo of Billy), and a presence icon 214 indicating whether Billy is free for chatting, offline, busy, away, etc. A "talk" icon 216 allows user B to initiate an immediate VoIP telephony call with Billy. An icon 218 indicates the current type of communication bearer (protocol) by which Billy is currently connected to the IM server 30. For instance, if user B knows that Billy is currently connected to the messenger service using 3G, user B may be reluctant to initiate a voice call if the IM service provider charges for 3G based data usage Field 220-B displays contact and presence information for the next contact following Billy, which in the example is Bob, i.e., the user of device 110-A. Bob had previously published a presence of "free" to presence server 50, signifying that Bob is presently available for at least instant messaging. Thus, presence icon 224 indicating "free" is displayed. Phone icon 226 and communication bearer icon 228 have the same functions as those discussed above for items 216 and 218 in field 210. A device icon 223 indicates a camera and abuts circled number ("2") icon 241. Note that he circled numbers refers to the number of content items available. This signifies that the contact in the field 220-B, i.e., Bob, has two items of content stored on his camera that are currently available for sharing with user B. If user B performs a predetermined operation on icon 223 or 241 indicative of a download request, the two contents associated with Bob's camera may be immediately downloaded to device 100-B. The predetermined operation may be designed by the device designer, and could be a simple tap on the icon 223 or 241, a long touch, a multi-tap, etc. Similarly, icon 227 indicates that Bob's Galaxy® brand smart phone has nine items available for sharing; icon 225 shows that Bob's PC has 11 items available and 229 indicates his laptop has three items available. All of this device-related content information was previously published by Bob to presence server 50 as being applicable to user B. Once the download of the shareable contents is completed, the relevant icons 223, 225, etc. may be caused to automatically disappear from the contact field 220-B, so that a downloading operation of the same contents need not be repeated.

In certain embodiments, an icon 221 indicative of a communication bearer (also referred to as communication protocol) associated with the shareable contents of the source device is displayed. In the example, a Wi-Fi image 221 is displayed adjacent the camera icon 223, which may indicate that the available contents from camera 223 are only downloadable when at least the source device (of user A) is connected to the messaging service via Wi-Fi. Thus, icon 221 indicates that the contents are protocol restricted. In some embodiments, both the source device 100-A and the target device 100-B must be connected with the designated protocol for the download to proceed. This option allows users to limit data usage charges that may otherwise occur with some connection protocols such as 3G or 4G, particularly for large file downloads, e.g., video clips. Note that protocol icon 221 is associated with the potential shareable contents, and differs from the protocol icon 228 which indicates the current connection protocol of the source device 100-A. Thus, for example, in screen 200-B, if user B observes that Bob is connected with 4G and the operative embodiment provisions that protocol-restricted files require both source and target devices to be connected with the displayed restricted protocol, user B may avoid attempting to download contents from camera 223 by observing that Bob is connected using 4G, indicated at 228. On the other hand, no such protocol-restriction icon is shown displayed on device icons 225, 227 and 229, whereby the receiving party B can be connected with any protocol to download the contents of those devices.

Referring to FIG. 2B, an example screen 200-C represents an IM messaging contacts screen of device 100-C corresponding to the above-noted scenario. User C is assumed to have also named Billy as a friend preceding Bob, such that field 210 is the same as that in FIG. 2A. Since user C has also named Bob as a friend, field 220-C presents Bob's contact and presence information. Since Bob has previously published presence information that does not include contents for sharing with user C, device 100-C has received no device or contents related presence information, whereby no icons such as 223, 225, 227 or 229 are shown in field 220-C.

As shown in FIG. 2C, device 100-D presents example screen 200-D, which includes the same field 210 as well as field 220-D. Here, Bob had previously published presence information allowing user D to access two photos from his camera, hence the icon 223 depicting a camera and the circled number "2" is displayed in association with user D's friend Bob.

Accordingly, screens 200-A, 200-B and 200-C illustrated that a publishing user is able to selectively publish different presence information to different respective target device users concerning content available for downloading from the publishing user's personal devices. In these examples, "shareable content presence information" is exemplified as composed of a device icon and a number (indicating the number of shareable content items available). However, in general, the shareable content presence information may only include, at a minimum, one or more of: a device icon; a device model; the number of shared content items; an IP address of a device with the available content; and a communication bearer (e.g., Wi-Fi, 3G or 4G) by which any available content is permitted to be received.

Figure 3:
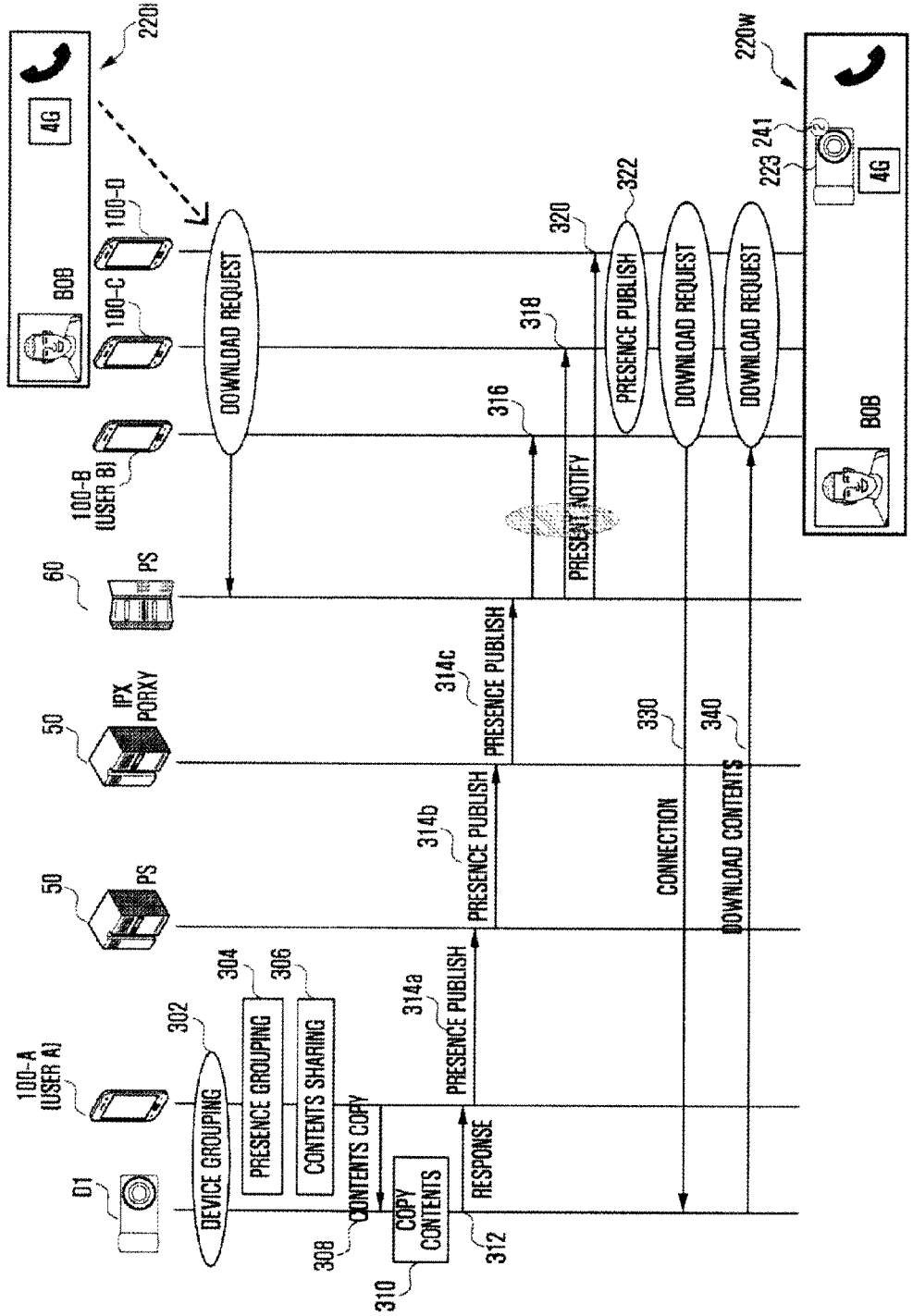
FIG. 3 is a signal flow diagram illustrating an example method of publishing presence information, notifying end users thereof and sharing content in accordance with the presently disclosed technology.

FIG. 3 is a signal flow diagram illustrating an example method of publishing presence information and notifying end users thereof in accordance with the presently disclosed technology. The flow diagram illustrates an example by which a user A of a publishing device 100-A desires to make the same content available from at least a personal camera D1 to each of users B, C and D of target devices 100-B, 100-C and 100-D, respectively, as a group. Initially, users B, C and D are assumed to have each previously transmitted, at 301, a "Subscribe" request to presence server 60 with respect to user A. The Subscribe request conveys a selection of user A for inclusion within a friends list in the respective devices 100-B, 100-C and 100-D. As a result, user A is set as a subscriber for each devices 100-B, 100-C and 100-D, which means that if the status of user A changes, information pertaining to this changed status is sent to users B, D and D. At the time of the Subscribe request at 301, an initial friend list field 220*i* is displayed in each of the devices 100-B, 100-C and 100-D friends lists. At this time, user A has not yet published any indications of available content information for sharing, thus, the initial field 220*i* is devoid of any content based presence information (such as the icons 223, 225 in FIGS. 2A-2C).

Sometime after the Subscribe request at 301, user A decides to update his presence status by publishing information on the availability of two content items (two "contents") for sharing (e.g., photos or videos) which are currently stored in his personal camera D1. To this end, user A performs a Device grouping operation at 302 in which he selects, via a user interface on device 100-A, content to be made available for sharing from any desired device (in this case, device D1 ). Next, at 304, user A commands a Presence Grouping operation at 304, in which he selects particular friends on his friends list to be permitted to receive all of the selected contents. (An example presence grouping operation is described later in reference to FIG. 4.) In this example, user A selects each of users B, C and D to receive the two selected contents.

User A then inputs a Contents Sharing command at 306. This causes device 100-A to send a Contents Copy request to device D1 at 308. Device D1 copies the requested contents from its memory at 310 and transmits a file containing the same at 312 to device 100-A. Device 100-A thereafter transmits a Presence PUBLISH message at 314*a* to presence server 50, which is in turn forwarded at 314*b* to IM server/IPx proxy 30 and then at 314*c* to presence server 60. The presence PUBLISH message contains the updated presence information for device 100-A, which includes, in this example, an indication of the personal device (camera D1) from which newly available content is available, and the number of contents available.

It is noted here that the presence servers 50 and 60 are depicted as distinct entities from the IM server/IPx proxy 30. In other embodiments, presence servers 50 and 60 can be a part of the IM server/IPx proxy 30.

Presence server 60 forwards a Presence NOTIFY message containing the updated presence information of user A to each of target devices 100-B, 100-C and 100-D at steps 316, 318 and 320, respectively. Each target device then performs a presence update operation at 322 in which the respective friends list (such as 200-B, 200-C and 200-D) is updated to change the contact field 220*i* to that of 220*u*. For instance, example contact field 220*u* represents an updated version of field 220*i*, and contains the camera icon 223 with the number "2" displayed in association, indicating that two contents which originated from user A's camera are now available for sharing from user A. If a user of any of the target devices selects the icon 223, a download request message is automatically transmitted from that target device at 330 to either device 100-A, or, directly to device D1, depending on control data provided in the presence information. In any case, the contents are then preferably automatically downloaded to the target device at 340, i.e., without any additional operation required by user A.

If the set-up condition was such that the shareable content had already been transferred from device D1 to device 100-A, the download request 330 may extend only to device 100-A, and the download is performed by device 100-A. On the other hand, if the set-up condition is for a direct access of device D1, via the provision of device D1's IP address in the published presence information, the download request 300 can proceed directly to device D1. For instance, if the presence information data includes an IP address for the peripheral device and other control data, the target device may recognize that the peripheral device is to be accessed directly, and include the destination IP address in its request message. Alternatively, a predetermined response indicative of the icon 223 selection is forwarded by the target device to the IM server 30, and the IM server 30 makes the routing decision to connect either device 100-A or D1 to the target device.

Figure 4:
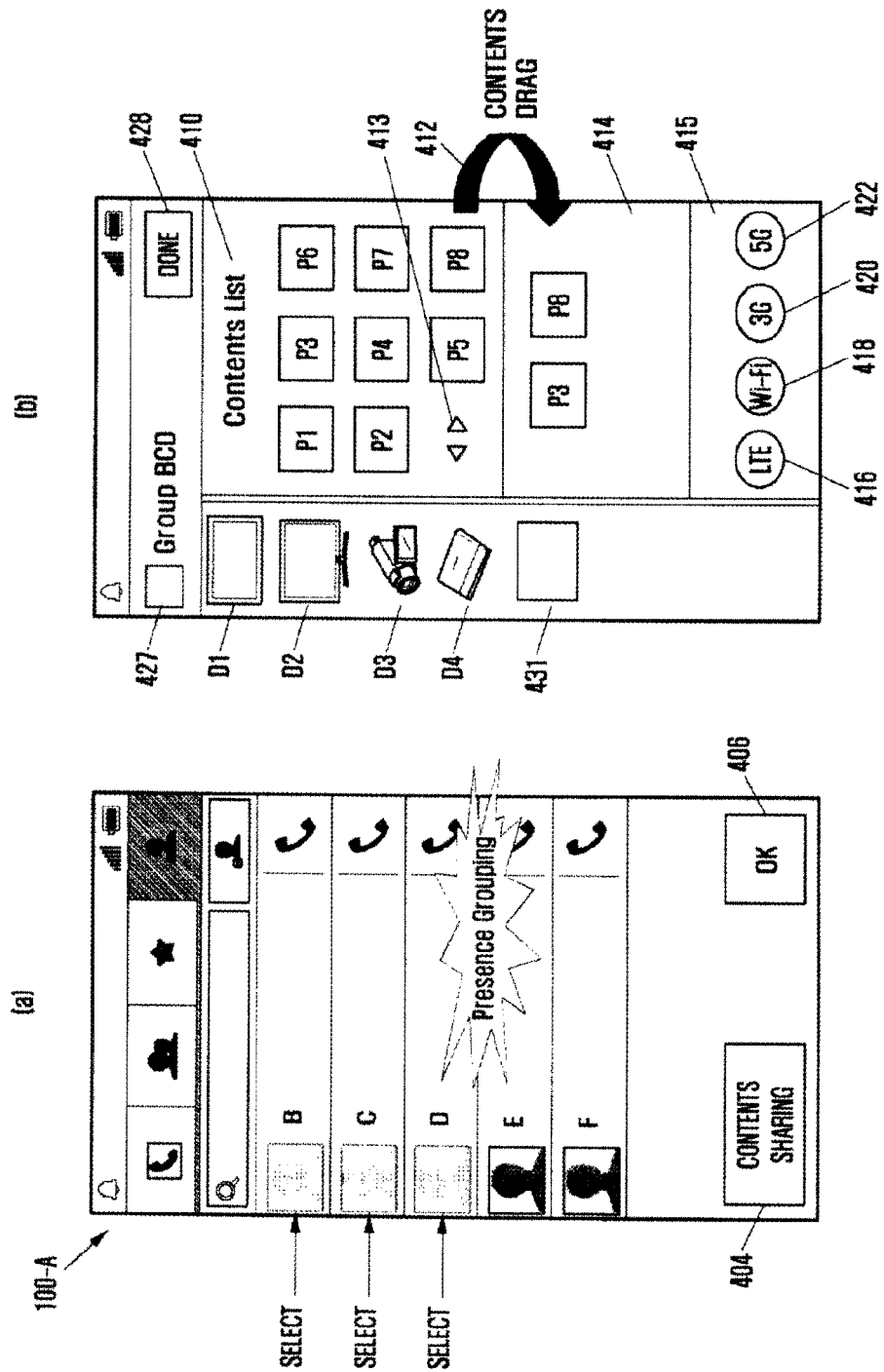
FIG. 4 shows example screenshots of a messaging application screen on a contents sharing device, for illustrating a presence grouping operation.

FIG. 4 shows example screenshots of a messaging application screen on a contents sharing device 100-A, which illustrate a presence grouping operation 304 in the method of FIG. 3. During the execution of a messaging application in which a contacts list is displayed, the device user is able to select a group of contacts permitted to receive selective contents. More specifically, the selected group of contacts is designated to receive a presence notification (stemming from a presence PUBLISH) corresponding to the same shareable contents, and to thereafter automatically receive the contents upon request. In FIG. 4, screen (a) shows that a friends list containing friends B through F is displayed during a messaging application. The messaging application may configure the friends list such that if an input touch is detected on an area of a friend's name or photo, the display field of that friend is highlighted, indicating it has been selected for a subsequent operation. In screen (a), the user has selected friends B, C and D via touch input. A contents sharing icon 404 or the like may then be selected and automatically highlighted, indicating that contents sharing operation will be applied to the selected contacts.

Upon detecting touch input on an OK icon 406 or other predetermined command, the display changes to a content selection screen (b) relevant to the selected group of contacts. The selection screen (b) may contain a group indicator field 427 indicating the group of contacts selected for the content sharing, a device selection field 431, a contents list selection field 410, a selected contents field 414 and a communication bearer selection field 415. Device field 431 contains icons representing peripheral devices of control device 100-A. In the example, images of example peripheral devices D1, D2, D3 and D4 represent a tablet, laptop, video camera and digital camera, respectively. When a touch input is detected on any of these images, information of content items from the selected device is displayed in thumbnails or other suitable form in the contents list field 410. Any suitable means of retrieving and displaying representations of the contents can be employed. Since, in the case of a handheld device 100-A, the display screen is of a constrained size, a relatively small number of content items, P1 to P8, are displayed. The contents list is scrollable via directional arrows 413 to access more content in the selected device D4. If the contents consist of text files, images of just the file names may be displayed in field 410. For a video clip, a representative still image may be displayed.

A user may select a particular content item for inclusion in a selected contents group of field 414 via a predetermined operation such as a touch and drag 412 ending in the field 414. In the example, the user has selected items P3 and P8 for content sharing corresponding to group BCD. Either before or after the user inputs a content selection completion command by selecting a "done" icon 428 or the like, metadata may be added to each file of selected content in field 414, where the metadata indicates the device, e.g., D4, from which the content originated. In this manner, when contents from various devices D1-D4 are selected and grouped in field 414 as available content for the presence group BCD, the peripheral device information is attached to each file. It is noted here, once content is selected and an icon thereof is placed in field 414, predetermined rules may be used to determine whether or not the entire file contents should be transferred from the peripheral device to device 100-A for the purpose of facilitating the subsequent contents sharing with the target devices. For instance, a rule based on the size of the selected file may be used, e.g., if the selected file exceeds a predetermined number of megabits, it is not copied to device 100-A.

It is further noted, in some cases, the user desires to grant unlimited access to one or more peripheral devices D1-D4 rather than selecting specific available content. In this scenario, a preconfigured input operation, such as a drag of the device icon in field 431 directly to field 414, can be employed to indicate an unlimited access grant.

Field 415 displays communication bearer icons 416-422, each indicating a specific protocol by which the selected contents of field 414 can be designated for a downloading operation to the target user devices. This is referred to as a protocol restriction for particular content. For instance, the user may select only the Wi-Fi icon 418, which restricts the allowed downloading protocol for the contents to Wi-Fi. Other options include selectable icons for LTE (4G) 416, 3G 420, or 5G 422. When a particular protocol such as Wi-Fi is chosen, both the sending side device 100-A and target device 100-B, -C or -D are required in some embodiments to be connected via that protocol at the time of a requested download, in order for the download to proceed. As illustrated earlier in FIG. 2A, in the target device user interface, an indication of the protocol restriction, if any, can be displayed in association with the available content presence information. One benefit of the protocol restriction is to enable users to control data usage costs. For instance, the data costs for Wi-Fi usage may be significantly less than each of the other protocols. If user A of the transmitting device 100-A groups available content, including large files such as videos, to users B, C and D, although user A may set up the available content while using Wi-Fi, he may thereafter leave a Wi-Fi area before any of users B, C or D request an automatic download. Once out of the Wi-Fi area, user A may be unwilling to download the contents from his device due to data costs for 3G, 4G or 5G, thus the Wi-Fi restriction on the available contents prevents this from happening. Similarly, if users B, C and D are family members of user A, user A may desire to limit the data usage costs for the devices 100-B, -C and -D, by preventing users B, C and D from downloading large files in protocols other than Wi-Fi.

It should be noted, the user interface may be designed to allow the protocol restriction to be applied only to particular ones of the selected files, or only to files originating from particular devices from among D1-D4. Predetermined icons and/or input commands can be implemented on the user interface screen (b) to realize the selective protocol restriction allocation.

Figure 5:
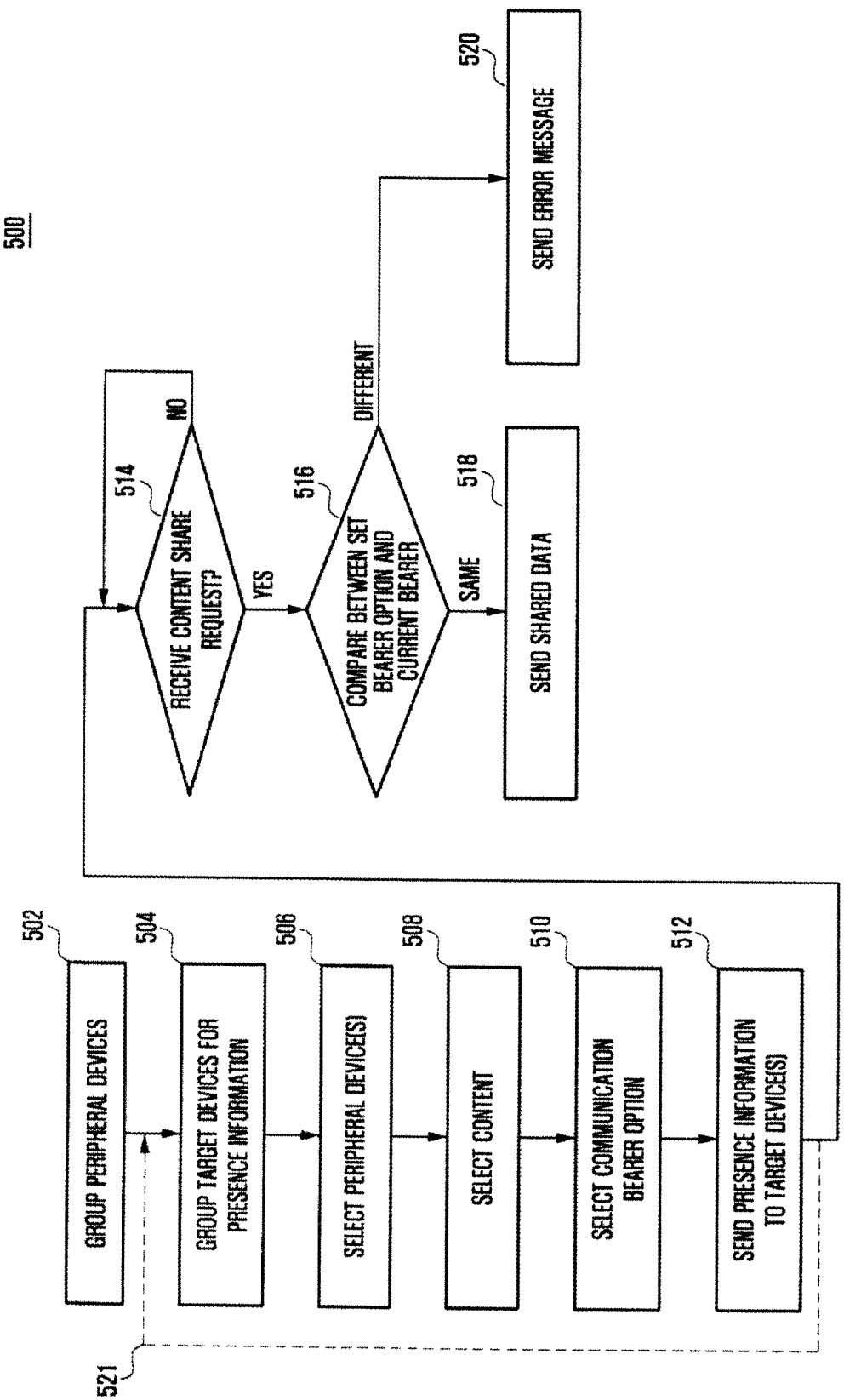
FIG. 5 is a flow chart illustrating a method performed in a source device for sharing selective content in a presence-based sharing environment according to an embodiment.

FIG. 5 is a flow chart illustrating a method, 500, performed in a source device for sharing selective content with target devices in the presence-based sharing environment according to an embodiment. In the following discussion, the source device is exemplified by device 100-A of FIG. 1, where the user/owner will be referred to as user A, and the target devices may be any one of devices 100-B, -C or -D operated by users B, C and D, respectively. In method 500, content offered for sharing may be either content stored in device 100-A, or content stored in one or more peripheral devices associated with device 100-A, e.g., D1-D4 described above. In the latter case, user A is permitted to select devices for grouping in association with the control device 100-A, and such grouping is performed with the use of a suitable preconfigured user interface menu at block 502. In a LAN formed between device 100-A and peripheral devices D1-D4, connection among devices is achievable using Bluetooth or other short range protocol, where device 100-A can act as a master to control peripheral devices D1-D4. If several peripheral devices are grouped, permission may be granted to a target device to access content of any one of the grouped devices, preferably with the use of a password-protected security scheme.

Another way to connect with and control peripheral devices for grouping at block 502 and eventual content sharing is disclosed in co-pending U.S. patent application Ser. No. 13/174,372, by the inventor of the present application, the disclosure of which is incorporated herein by reference in its entirety. The '372 application explains that with the use of a 3G/4G control server of a service provider, such as control server 110 shown in FIG. 1 herein, peripheral nodes can be grouped in association with the control device, with the use of a category from grouping, such as a phone number of the control device. The wireless system registers the peripheral nodes in the control server in order to facilitate the connection between the nodes.

Next, at block 504, user A is permitted to select a group of target devices to receive common presence information.

This operation may involve the selections described above in screen (a) of FIG. 4, in which the user inputs a suitable grouping command on a messenger application screen friends list, and directly selects friends for grouping. The display screen then progresses to screen (b), which shows e.g., that Group BCD is formed. Thereafter, at block 508, one or more peripheral devices D1-D4 is selected (from field 431) to be included in the presence information to the group, and then specific contents are optionally selected at block 508, e.g., content items are selected from field 412 and dragged to field 414.

It is noted here that user A may wish to allow a target device user or target user group to have unrestricted access to one or more peripheral devices D1-D4. In this case, block 508 would be skipped, and the resulting icon for the peripheral device displayed on the target device screen would omit a contents number. For instance, in FIG. 2A, at the target device, the camera icon 23 could be displayed without the circled number "2", indicating unlimited access is available. When the target user selects icon 23 in this scenario, a menu screen would preferably appear with a field for password entry. Once a password is entered, a link would be established directly from the target device to the peripheral device, and the password would be checked via security software installed at the peripheral device. If the password is correct, the target user may then scroll through content at the peripheral device through remote access software.

After block 508, the user has the option of placing a communication bearer constraint (protocol constraint) on the downloadable contents as part of the presence information, as described above with respect to field 415 of FIG. 4. All the presence information is then transmitted to the target device(s) at block 512. At this point, the user may initiate another content sharing selection, as indicated at path 521.

At query box 514, if control device 100-A receives a content share request from one of the target devices, and if the protocol constraint was imposed at block 520, a comparison is made at query box 516 between the set bearer option and the current bearer of either device 100-A or of the peripheral device D1-D4 identified in the presence information. If the bearers are the same, the contents are downloaded at block 518. If the bearers are different, device 100-A or the peripheral device sends an error message to the target device.

Figure 6:
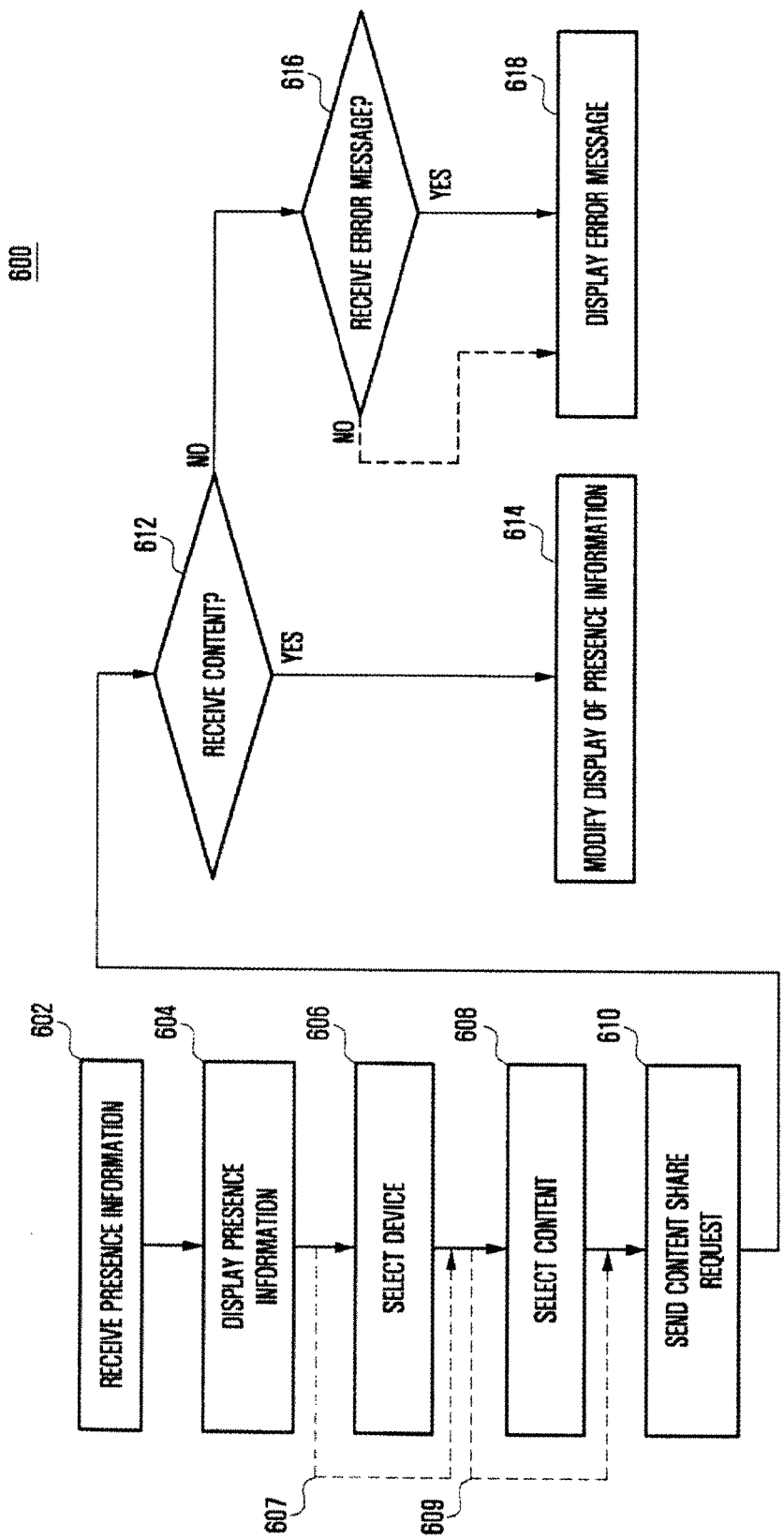
FIG. 6 is a flow chart illustrating a method performed in a receiving device for receiving shared content in a presence-based sharing environment according to an embodiment.

FIG. 6 is a flow chart illustrating a method operable in a receiving (target) device for receiving shared content in a presence-based sharing environment according to an embodiment. At block 602, presence information of a source device user is received, e.g., during the execution of an instant messenger application. The presence information is displayed at block 604, so as to update a friends list or the like, as in the examples of FIGS. 2A-2C. If the presence information contains an icon for a peripheral device D1-D4, or for the control device itself (e.g., 100-A), the icon is displayed as a selectable icon (e.g., 223), in which an action is automatically performed when touch on the icon or other predetermined selection means therefor is detected. In this condition, a selection of the device icon is detectable at block 606. If no device icon is included in the presence information, block 606 is skipped as indicated by path 607.

As mentioned earlier, presence information can include both a device icon (e.g. 223) and an associated contents icon such as 241. In this case, the user interface may be designed to allow the user to preview the contents before a request is sent to fully download the contents. Preview information for contents may be included along with the presence information, and temporarily stored but not displayed unless requested by the target user. For example, preview information may be a low resolution still image of a video clip; a file name of a long text file; a brief summary, etc. Thus, if a device icon is selected at 606, multiple preview images for respective contents may be caused to automatically appear in a pop up window. The user may then select one or more of the preview images at block 608, thereby selecting the associated content for downloading. This selection can be followed by a specific content share request at block 610 for all the selected contents, via another predetermined input, e.g., on a "download" icon or the like.

If no device icon is included as mentioned above, but at least one content icon is included, block 606 is skipped and then if the user selects a content icon, preview images for contents are similarly displayed for selection at block 608.

In another scenario, mentioned earlier, the target user is granted unlimited access to a peripheral device. Here, the device icon 223 may be displayed without a specific indication of a number of contents, but with an indication of unlimited access. If the device icon is then selected at block 606, block 608 is skipped as indicated by path 609. A window may then be generated which includes an input field for a password to grant remote access to the peripheral device, thereby providing some measure of security against unauthorized users and hackers to the peripheral device's contents.

Once the content share request is sent at block 610, if the content is received (query box 612), the content is stored in memory and the display of the presence information is modified at block 614. For instance, the relevant presence information may be caused to disappear, or it may be displayed in a faded an unresponsive manner to indicate that downloading has already occurred. If, however, the content is not received, and an error message originating from the source device is received, the error message is displayed at block 618. One cause of such error could be that the content sharing is protocol-constrained, e.g., to Wi-Fi, but the source device is currently connected via 3G or 4G. If no error message of this type is received but the content is nevertheless not received, a different type of error message may be displayed at block 618; this condition is indicated by path 619.

Figure 7:
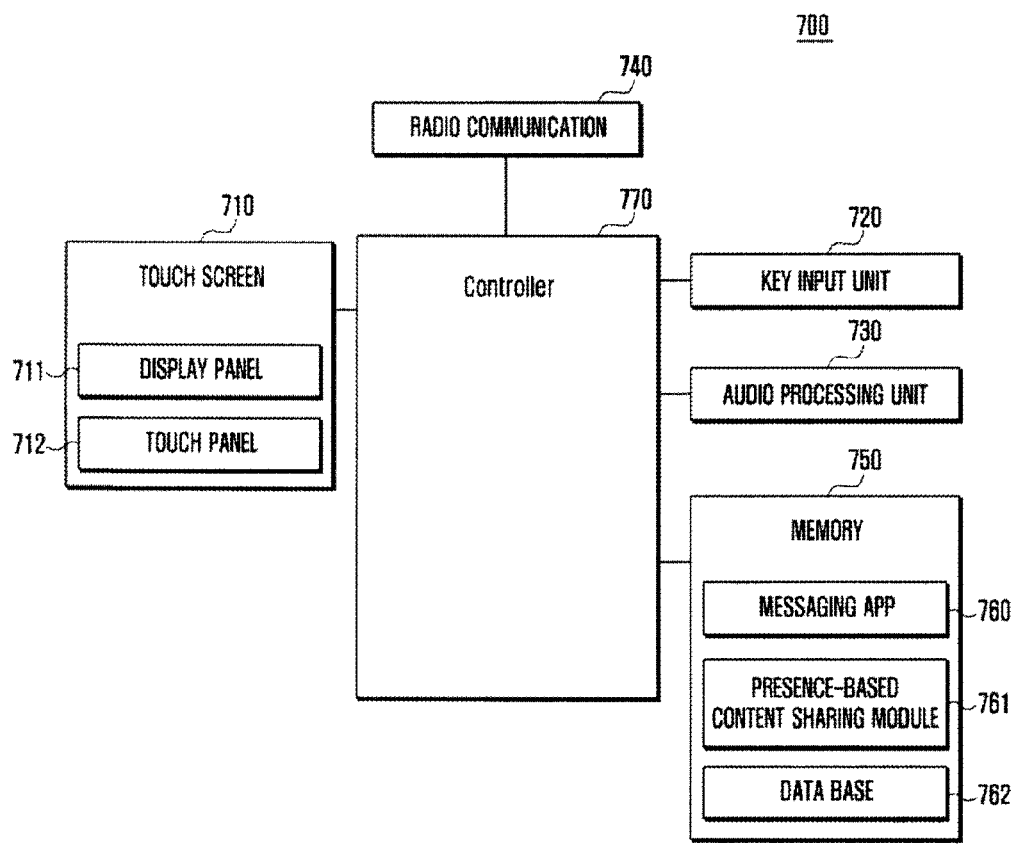
FIG. 7 is a functional block diagram of an exemplary user device configured to share contents in accordance with the present technology.

FIG. 7 is a functional block diagram of an example electronic device, 700, which is an embodiment of any of the devices 100 of FIG. 1. Device 700 can function as both a control device for transmitting content to be shared, and as a target device for receiving shared content. Device 700 can be a smartphone, tablet computer, smart camera, or any other processing device that normally has a display and a user input mechanism for detecting user commands. Device 700 includes a controller 770 that includes at least one processor and generally controls all the operations of device 700. A touch screen 710 may be provisioned to directly receive touch input from a user with a touch implement, e.g., the user's finger or a stylus. a touch panel 712 detects the touch input and a display panel 711 displays the images of the touch screen 710. A physical key input unit 720 is also be provided to receive control inputs, e.g., power on/off, volume adjustment, immediate home screen access, and optionally, physical character keys to supplement the touch screen (or, if just a display with no touch screen is included, to receive all user inputs for device 700). An audio processing unit 730 outputs audio and receives user voice input for telephony communication, recordings, and voice commands. A radio communication unit 740 is configured to transmit/receive data over a number of wireless communication protocols for both short range and long range data communication. Examples of short range protocols include Wi-Fi, Bluetooth, Zigbee, etc. Examples of long range protocols include 3G and 4G.

Memory 750 includes a messaging application 760 which is executed by controller 770. It should be noted that device 700 can be a commercially available, handheld portable device such as a Samsung Galaxy® smart phone, which is enhanced by the messaging application 760. Messaging app 760 may be a conventional messaging app enhanced by a presence-based content sharing module 761 and database 762. The execution of messaging app 760 by controller 770 causes execution of the operations in any of the methods described above with respect to FIGS. 3, 5 and 6 above, which may include the generation of screens on display panel 711 as depicted in any one of FIGS. 2A, 3B, 2C and 4 hereinabove.

As described in the exemplary embodiments above, implementations of the presently disclosed technology enable a control device user to selectively control which target users are permitted to receive shareable contents controlled by the control device, in a presence-based messaging environment. Embodiments also provide enhanced presence information in a user interface on the receiving side, allowing users to conveniently select content for immediate download, or to access specific peripheral devices presented in the presence information.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. No claim element herein is to be construed under the provisions of 35 U.S.C. 112, sixth paragraph, unless the element is expressly recited using the phrase "means for."

While the exemplary embodiments described herein have been particularly shown and described with reference to exemplary embodiments thereof, it will be understood by those of ordinary skill in the art that various changes in form and details may be made therein without departing from the spirit and scope of the invention as defined by the following claims and their equivalents.

What is claimed is:

1. A method for sharing content, comprising:
    detecting, by a first device, a selection for content to be shared;
    during an absence of an active communication session between a first user of the first device and a second user of a target device, publishing, by the first device to the target device, presence information including:
        a presence state of the first user of the first device indicating availability of the first user to communicate in real-time with the second user, and
        an indication of a peripheral device associated with the first device, wherein the selected content is stored by the peripheral device and is downloadable to the target device from the peripheral device;
    receiving, by the peripheral device, a message from the target device indicative of a request for downloading the selected content, and transmitting, by the peripheral device that received the message, the selected content to the target device;
    executing a messaging application and displaying a contact list screen thereof at the first device;
    selecting the at least one target device by selecting a target contact from the contact list screen, wherein the contact list contains a plurality of other target contacts besides the selected contact; and
    publishing presence information to each of the other target contacts which excludes the indication of the peripheral device, whereby the selected content is not downloadable to the other target contacts.

2. The method of claim 1, wherein the at least one contact is a selected group of contacts.

3. The method of claim 1, further comprising receiving, by the first device, a message from the target device indicative of a request for downloading the selected content, and transmitting, by the first device that received the message, the selected content to the target device.

4. The method of claim 1, wherein the presence information further includes an indication of a specified communication protocol restriction in which the content is downloadable to the target device only if at least the first device is connected to a wide area network via the specified communication protocol.

5. The method of claim 4, wherein the communication protocol restriction prevents the content from being downloadable to the target device unless both the target device and the first device are connected to the specified communication protocol.

6. The method of claim 1, further comprising receiving, by the first device, shared content from a third party device by:
    executing a messaging application which displays a contact list screen containing a plurality of contact fields, each contact field associated with a specific contact and displaying presence information of that specific contact, wherein the presence information of a given contact also displays a selectable item representing shareable content available from the third party device which is controlled by the given contact;
    detecting a selection for the selectable item;
    transmitting a request for the available shareable content in response to the detected selection to the third party device; and
    receiving the shareable content from the third party device.

7. The method of claim 1, wherein the presence information further includes an indication of a number of contents available from the peripheral device.

8. The method of claim 1, wherein:
    the selection for content to be shared is a selection for all content in the peripheral device; and
    the presence information including the indication of the peripheral device is provided without an indication of a number of contents available, and operates as an indication that all contents of the peripheral device are accessible by the target device via a remote access operation.

9. The method of claim 1, wherein the presence information includes an Internet Protocol (IP) address of the peripheral device.

10. A method performed in a first device for sharing content with at least one second device, comprising:
 executing a messaging application in which a contact list is displayed;
 detecting a first selection, from among contacts displayed on the contact list, of a group of contacts constituting only a portion of the displayed contacts, to receive shared content, wherein the contact list contains a plurality of other contacts besides the selected group of contacts;
 thereafter, detecting a second selection from among a contents list of contents to be shared with the group of contacts;
 during an absence of an active communication session between a first user of the first device and a second user of the at least one second device, publishing presence information to all of the contacts on the contact list indicating availability of the first user to communicate in real-time with the contacts, wherein
  an indication of contents available for sharing, corresponding to the second selection, is included in the presence information published to only the selected group of contacts, and
  the presence information published to only the selected group of contacts further includes an icon representing a peripheral device associated with the first device and within which the contents available for sharing are stored; and
 publishing presence information to each of the other contacts which excludes the indication of the peripheral device, whereby the contents available for sharing is not downloadable to the plurality of other contacts.

11. The method of claim 10, wherein the indication of contents available for sharing further comprises at least one of a number of contents available, a device model of the peripheral device, and an Internet Protocol (IP) address of the peripheral device.

12. The method of claim 10, wherein the presence information published to the selected group of contacts further includes an indication of a specified communication protocol restriction in which the content is downloadable to the at least one second device only if at least the first device is connected to a wide area network via the specified communication protocol.

13. The method of claim 12, wherein the communication protocol restriction operates to prevent the content from being downloadable to the at least one second device unless both the at least one second device and the first device are connected to the specified communication protocol.

14. The method of claim 10, wherein the presence information further includes current communication bearer information of the first device.

15. The method of claim 10, further comprising receiving a message from the at least one second device indicative of a request for downloading a selected content, and transmitting, by the first device, the selected content to the at least one second device.

16. The method of claim 10, further comprising receiving, by the first device, shared content from a third party device by:
 executing a messaging application which displays a contact list screen containing a plurality of contact fields, each contact field associated with a specific contact and displaying presence information of that specific contact, wherein the presence information of a given contact also displays a selectable item representing shareable content available from the third party device which is controlled by the given contact;
 detecting a selection for the selectable item;
 transmitting a request for the available shareable content in response to the detected selection to the third party device; and
 receiving the shareable content from the third party device.

17. A first device for sharing content with at least one second device, comprising:
 a display on which a contact list of a messaging application is displayed;
 a memory that stores the messaging application and the contact list thereof;
 a controller having at least one processor, the controller configured to execute the messaging application and control the display to display the contact list, to:
  detect a first selection, from among contacts displayed on the contact list, of a group of contacts constituting only a portion of the displayed contacts, to receive shared content, wherein the contact list contains a plurality of other contacts besides the selected group of contacts;
  thereafter, detect a second selection from among a contents list of contents to be shared with the group of contacts;
  during an absence of an active communication session between a first user of the first device and a second user of the at least one second device, publish presence information to all of the contacts on the contact list indicating availability of the first user to communicate in real-time with the contacts, wherein:
   an indication of contents available for sharing, corresponding to the second selection, is included in the presence information published to only the selected group of contacts, and
   the presence information published to only the selected group of contacts further includes an icon representing a peripheral device associated with the first device and within which the contents available for sharing are stored; and
  publish presence information to each of the other contacts which excludes the indication of the peripheral device, whereby the contents available for sharing is not downloadable to the plurality of other contacts.

18. A non-transitory recording medium storing program instructions that, when executed by a processor cause an electronic device to perform the method of claim 10.

* * * * *